US009107071B2

(12) United States Patent
Zhu et al.

(10) Patent No.: US 9,107,071 B2
(45) Date of Patent: Aug. 11, 2015

(54) METHOD AND SYSTEM FOR TRANSMITTING WIRELESS DATA STREAMS

(75) Inventors: Ling Zhu, Su Zhou (CN); Xiao-Xiang Qian, Su Zhou (CN)

(73) Assignee: SERNET (SHUZHOU) TECHNOLOGIES CORPORATION, Jiangsu (CN)

( * ) Notice: Subject to any disclaimer, the term of this patent is extended or adjusted under 35 U.S.C. 154(b) by 566 days.

(21) Appl. No.: 13/530,229

(22) Filed: Jun. 22, 2012

(65) Prior Publication Data

US 2012/0331520 A1  Dec. 27, 2012

(30) Foreign Application Priority Data

Jun. 24, 2011  (CN) .......................... 2011 1 0171433

(51) Int. Cl.
| | |
|---|---|
| H04W 12/06 | (2009.01) |
| H04W 12/08 | (2009.01) |
| H04W 84/04 | (2009.01) |
| H04L 29/06 | (2006.01) |
| H04W 8/08 | (2009.01) |

(52) U.S. Cl.
CPC ............. *H04W 12/06* (2013.01); *H04L 63/107* (2013.01); *H04W 8/082* (2013.01); *H04W 12/08* (2013.01); *H04W 84/045* (2013.01)

(58) Field of Classification Search
CPC ....... H04L 63/10; H04L 63/107; H04L 63/08; H04W 12/06; H04W 12/08; H04W 84/045; H04W 36/18
USPC ........ 726/3, 4, 26, 27, 29; 709/225, 227, 229; 455/410, 411, 436, 444; 370/331, 338
See application file for complete search history.

(56) References Cited

U.S. PATENT DOCUMENTS

| 8,477,724 B2* | 7/2013 | Bakker et al. ................. 370/331 |
| 8,705,354 B2* | 4/2014 | Takano et al. ................. 370/230 |

(Continued)

FOREIGN PATENT DOCUMENTS

| CN | 101841886 | 9/2010 |
| CN | 101998367 A | 3/2011 |
| WO | WO 2011127684 A1 * | 10/2011 |

OTHER PUBLICATIONS

3GPP TS 22.220 v10.6.0, "3rd Generation Partnership Project; Technical Specification Group Services and System Aspects; Service requirements for Home Node B (HNB) and Home eNode B (HeNB) (Release 10)". Apr. 2011. 25 pgs.*

(Continued)

*Primary Examiner* — Zachary A Davis
(74) *Attorney, Agent, or Firm* — McClure, Qualey & Rodack, LLP

(57) ABSTRACT

The disclosure provides a method and a system for transmitting wireless data streams. After a user equipment sends a packet data protocol context activation request signaling to a base station, the base station checks whether the user equipment is allowed to activate a local Internet protocol access (LIPA) function. If the base station decides that the user equipment is allowed to activate the LIPA function, the base station instructs a core network to execute authentication accordingly. The base station disconnects a signaling connection between the base station and the core network. The base station assigns a private IP address to the user equipment, so that the user equipment having the private IP address performs the LIPA function and is directly connected to an external network through the base station without going through the core network, and a data transmission is performed between the base station and the user equipment.

18 Claims, 2 Drawing Sheets

(56) References Cited

U.S. PATENT DOCUMENTS

2010/0272013 A1    10/2010  Horn et al.
2011/0171953 A1*   7/2011   Faccin et al. ............... 455/426.1
2011/0228750 A1*   9/2011   Tomici et al. ................ 370/338
2012/0189016 A1*   7/2012   Bakker et al. ................ 370/401
2013/0051327 A1*   2/2013   Kim et al. .................... 370/328

OTHER PUBLICATIONS

3GPP TR 23.829 v10.0.0, "3rd Generation Partnership Project; Technical Specification Group Services and System Aspects; Local IP Access and Selected IP Traffic Offload (LIPA-SIPTO) (Release 10)". Mar. 2011. 43 pgs.*

3GPP TR 23.859 v0.2.0, "3rd Generation Partnership Project; Technical Specification Group Services and System Aspects; LIPA Mobility and SIPTO at the Local Network (Release 11)". Apr. 2011. 15 pgs.*

Full English (machine) translation of CN101998367 (Published Mar. 30, 2011).

English translation of abstract of CN 101841886, (Published Sep. 22, 2010).

* cited by examiner

METHOD AND SYSTEM FOR TRANSMITTING WIRELESS DATA STREAMS

This application claims the benefit of People's Republic of China application Serial No. 201110171433.X, filed Jun. 24, 2011, the subject matter of which is incorporated herein by reference.

TECHNICAL FIELD

The disclosure relates in general to a wireless communication system and method, and more particularly to a method and a system for transmitting wireless data streams.

BACKGROUND

A 3G mobile communication system aims to provide users to access a broadband wireless multi-media service at any time and any place. Currently, a Universal Mobile Telecommunications System (UMTS) has been developed. The UMTS provides a high-quality voice service, a high-speed access band, multiple service quality mechanisms, a real-time or non-real time voice/data service and a security mechanism. The UMTS further provides a multi-access service function (which currently provides phone call service and network service) and a video call function.

In general, a network configuration of the UMTS has three main parts, namely, a user equipment (UE), a UMTS terrestrial radio access network (UTRAN) and a core network (CN).

The user equipment is a mobile user terminal equipment, such as a 3G mobile phone, through which the user accesses the internet and makes phone calls.

The UTRAN provides the user equipment to access to the core network service, and includes a radio network subsystem (RNS). The RNS includes a radio network controller (RNC) and several nodes B. Each node B (or referred to as a base station) is in charge of radio transmission and radio reception for one or several mobile phones. The RNC controls radio resources.

The core network is in charge of signaling switch and interfaces with external networks, such as a public switched telephone network (PSTN), an integrated service digital network (ISDN) and the Internet.

The base station includes a home node B (HNB), which provides 3G wireless coverage to 3G mobile phones inside the households. The base station is connected to an existing home broadband service.

Along with the continuous advance in the 3G network, the Internet information services put more and more network loading on telecommunication operators, and may even affect the voice communication quality. If the Internet information services can be directly connected to an external network through the base station without going through the core network, the network loading for the telecommunication operators will be largely reduced.

BRIEF SUMMARY OF THE DISCLOSURE

The disclosure is directed to a method and a system for transmitting wireless data streams. After a user equipment sends an Internet request, a base station checks whether the user equipment is allowed to activate a Local Internet Protocol Access (LIPA) function. If so, after passing authentication, the user equipment is directly connected to an external network through the base station without going through a core network so as to reduce the loading of the core network.

According to one embodiment of the present disclosure, a method for transmitting wireless data streams is provided. After a user equipment (UE) sends a packet data protocol (PDP) context activation request signaling to a base station, the base station checks whether the user equipment is allowed to activate a local Internet protocol access (LIPA) function. If the base station decides that the user equipment is allowed to activate the LIPA function, the base station instructs a core network to execute authentication accordingly. The base station disconnects the signaling connection between the base station and the core network. The base station assigns a private IP address to the user equipment, so that the user equipment having the private IP address performs the LIPA function and is directly connected to an external network through the base station without going through the core network, and a data transmission is performed between the base station and the user equipment.

According to one alternate embodiment of the present disclosure, a system for transmitting wireless data streams is provided. The system includes a user equipment, a base station, and a core network. After the user equipment sends a packet data protocol (PDP) context activation request signaling to the base station, the base station checks whether the user equipment is allowed to activate a local Internet protocol access (LIPA) function. If the base station decides that the user equipment is allowed to activate the LIPA function, then the base station instructs the core network to execute authentication accordingly. The base station disconnects a connection between the base station and the core network. The base station assigns a private IP address to the user equipment if the base station decides that the user equipment is allowed to activate the LIPA function, so that the user equipment having the private IP address performs the LIPA function and is directly connected to an external network through the base station without going through the core network, and a data transmission is performed between the base station and the user equipment.

It is to be understood that both the foregoing general description and the following detailed description are exemplary and explanatory only and are not restrictive of the disclosed embodiments, as claimed.

DETAILED DESCRIPTION OF THE DISCLOSURE

Detailed descriptions of the principles of the structure and operation of the disclosure are disclosed below.

Local Internet Protocol Access (LIPA) allows a user equipment (UE) having an IP address to be directly connected to an external network through a base station without going through a core network. In the following, a base station is an HNB or a RNC device. LIPA reduces the network loading for the telecommunication operators, and has attracted more and more attention of the telecommunication operators.

In one embodiment of the disclosure, when the base station is initialized, powered up, or started up, the base station obtains an LIPA assignment/check logic from an HNB Management System (HMS). The LIPA assignment logic records details related to the LIPA. The HMS is one of the network elements of the telecommunication operators. After a user equipment (UE) sends a packet switch (PS) connection establishment request signaling (also referred to as a packet data protocol (PDP) activation request signaling or an Internet request), according to the LIPA assignment/check logic, the base station checks whether the user equipment is allowed to activate an LIPA function. If the user equipment is allowed to activate the LIPA function and the base station passes authentication by the core network, then the base station implements the LIPA function, so that the user equipment having an IP address is directly connected to the external network through the base station without going through the core network.

Figure 1:
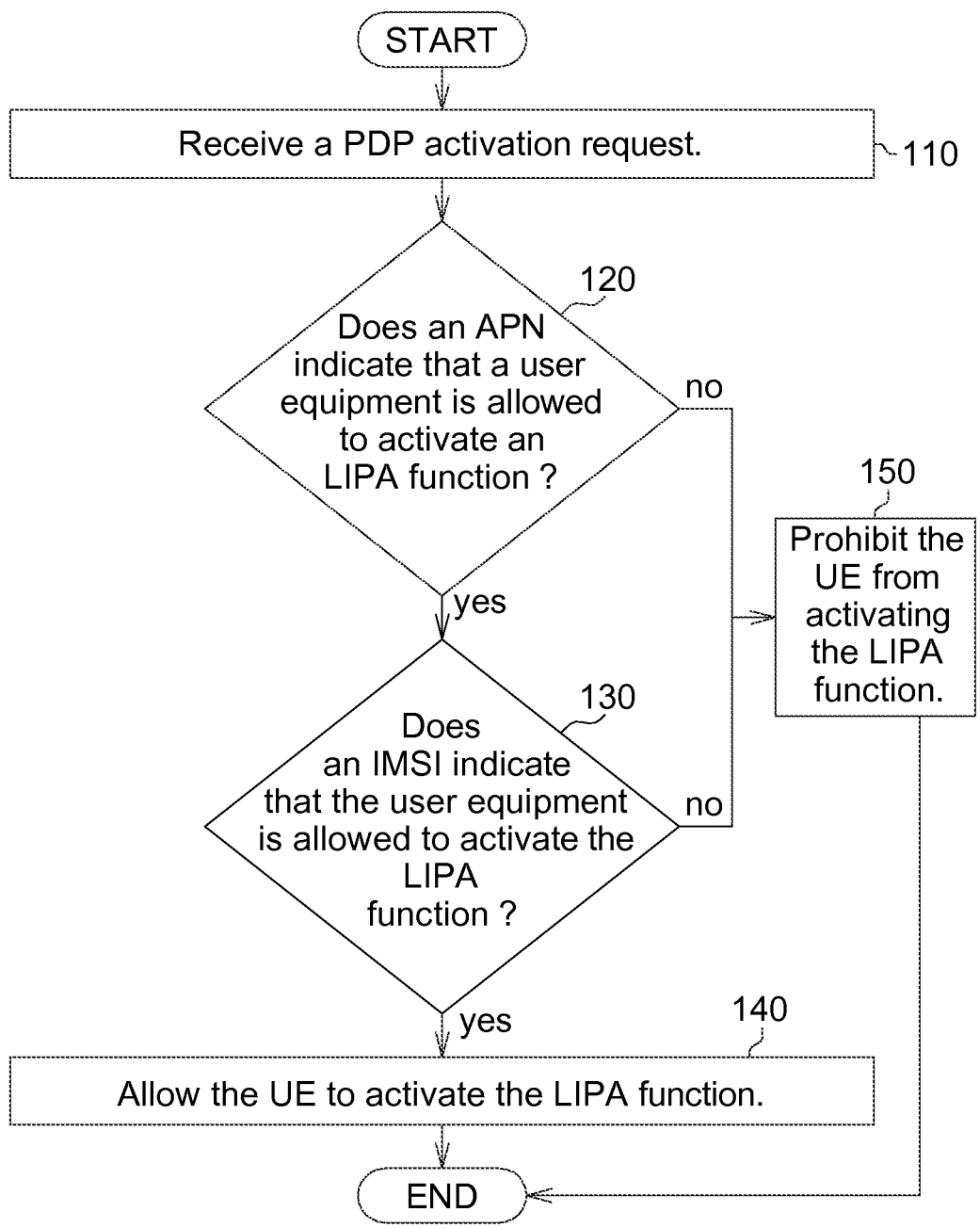
FIG. 1 is a flowchart of a process of checking whether a user equipment is allowed to activate the LIPA function according to one embodiment of the disclosure.

Referring to FIG. 1, a flowchart of a process of checking whether user equipment is allowed to activate the LIPA function according to one embodiment of the disclosure is shown. As indicated in FIG. 1, in step 110, the base station receives a PDP activation request signaling from the user equipment.

In step 120, according to the LIPA assignment logic obtained from the HMS of the telecommunication operators, the base station checks whether an access point name (APN) related to the user equipment indicates that the user equipment is allowed to activate the LIPA function. Here, according to the APN, the base station uses different IP address assignment modes. If the user equipment is allowed to activate the LIPA function, then the base station assigns a private IP address to the user equipment. If the APN indicates that the user equipment is allowed to activate the LIPA function (i.e. Yes in step 120), then the process proceeds to step 130. If the APN indicates that the user equipment is not allowed to activate the LIPA function (i.e. No in step 120), then the user equipment is prohibited from activating the LIPA function as indicated in step 150.

In step 130, according to the LIPA assignment logic obtained from the HMS of the telecommunication operators, the base station checks whether an international mobile subscriber identifier (IMSI) related to the user equipment is allowed to activate the LIPA function. The IMSI, stored in a subscriber identity module (SIM, also referred as user identity module) card, is used for identifying a number assigned to a mobile user. If the IMSI indicates that the user equipment is allowed to activate the LIPA function, then the user equipment is allowed to activate the LIPA function as indicated in step 140. If the IMSI indicates that the user equipment is not allowed to activate the LIPA function, then the user equipment is prohibited from activating the LIPA function as indicated in step 150.

In general, the telecommunication operators would control which the IMSIs to indicate whether the user equipment is allowed to activate the LIPA function or not. The permission for the IMSI to activate the LIPA function is approved by the telecommunication operators. If a user equipment is allowed to activate the LIPA function, then the user equipment may be directly connected to the external network through the base station without going through the core network, and the telecommunication operators would be unable to monitor the data streams of the user equipment.

Figure 2:
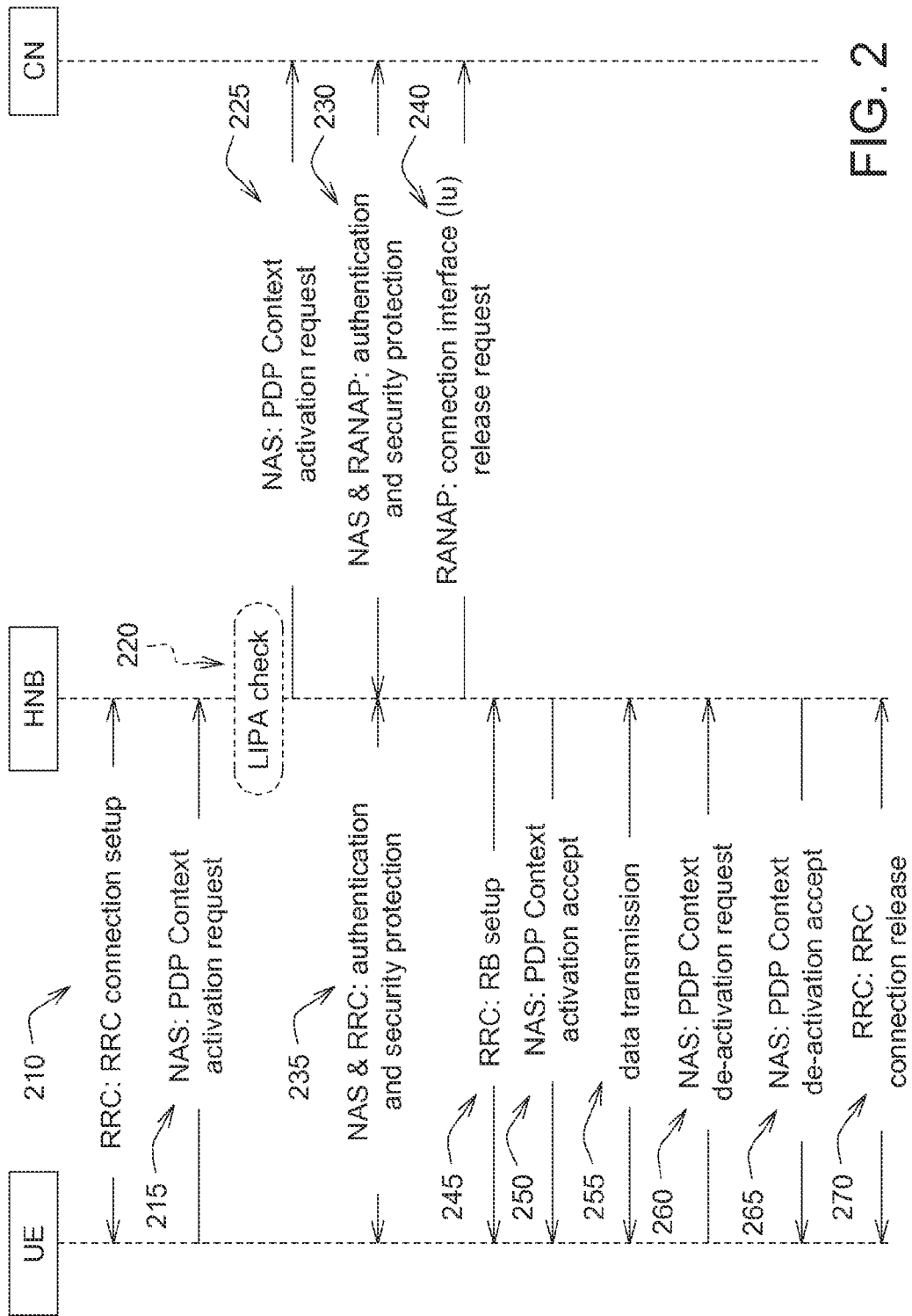
FIG. 2 is a flowchart of a method for transmitting LIPA data streams according to one embodiment of the disclosure.

Referring to FIG. 2, a flowchart of a method for transmitting the LIPA data streams according to one embodiment of the disclosure is shown. As indicated in FIG. 2, in step 210, a radio resource control (RRC) connection setup signaling is transmitted between the user equipment and the base station under a RRC protocol, so that a signaling connection channel is established between the user equipment and the base station for signaling transmission to each other. After the user equipment establishes an RRC connection, the user equipment will exit an idle mode and enter a connection mode to access a mobile network service.

In step 215, the user equipment sends a PDP context activation request signaling to the base station according to a non-access stratum (NAS) protocol. That is, transmission of the PDP context activation request signaling by the user equipment may be regarded as transmission of an Internet request signaling to the base station from the user equipment. NAS protocol is a protocol between the user equipment and the core network for processing a control signaling between the user equipment and the core network.

In step 220, the base station checks whether the user equipment is allowed to activate the LIPA function. Detailed descriptions of step 220 are similar to the descriptions indicated in FIG. 1, and are not repeated here.

In step 225, the base station sends a PDP context activation request signaling (that is, an Internet request signaling) to the core network (CN) under the NAS protocol. The base station informs the core network that the UE requests to access the internet through the LIPA function. After the user equipment passes the LIPA function check, the base station forwards such result to the core network, which accordingly completes subsequent authentication.

In step 230, a first authentication and security protection are performed between the core network and the base station under the NAS protocol and a radio access network application part (RANAP) protocol. In step 235, a second authentication and security protection are performed between the base station and the user equipment under the NAS protocol and the RRC protocol. To put it in greater detail, the core network performs the first authentication and security protection on the base station. If the base station passes the authentication performed by the core network, then the base station performs the second authentication and security protection on the user equipment. If the user equipment passes the authentication performed by the base station, then the base station reports such result to the core network. Step 230 and step 235 may be performed synchronously. The authentication of the user equipment is performed by the core network.

In step 240, after the base station successfully passes the authentication by the core network, the base station sends a connection interface (Iu) release request signaling to the core network under the RANAP protocol. The RANAP is a control plane protocol between the base station and the core network. When step 240 is completed, the signaling connection between the base station and the core network is basically interrupted.

In step 245, the user equipment and the base station send a radio bearer (RB) setup signaling to each other under the RRC protocol. A radio bearer selection is for selecting one way to transmit the data. In transmitting between an external network and a user equipment, a radio bearer must be established first. After the radio bearer is established, a "bearer" is allowed to be transmitted between the user equipment and the base station, and the Internet traffic of the user equipment is transmitted through the radio bearer. That is, the base station, instead of the core network, sends a radio bearer setup signaling to the user equipment.

In step 250, the base station sends a PDP context activation accept signaling to the user equipment under the NAS protocol. Moreover, the base station assigns its private IP address to the user equipment. That is, the base station sends an Internet request accept signaling to the user equipment under the NAS protocol.

In step 255, a data transmission is performed between the base station and the user equipment. The user equipment uses the private IP address assigned by the base station for the data transmission. Meanwhile, the base station performs a network address translation (NAT) for translating the private IP address assigned to the UE as an IP address of the base station for visiting the external network, so that the external network interprets the visit as a visit by the base station.

In step 260, the user equipment sends a PDP context de-activation request signaling to the base station under the NAS protocol. That is, the user equipment informs the base station that the user equipment is going to interrupt (or disconnect) the data connection. The PDP context de-activation request signaling may be regarded as a data disconnection request signaling.

In step 265, the base station sends a PDP context de-activation accept signaling to the user equipment under the NAS protocol. Then, a data transmission between the user equipment and the base station is not allowed, but a signaling transmission between the user equipment and the base station is still allowed. The PDP context de-activation accept signaling may be regarded as a data disconnection accept signal.

In step 270, the user equipment and the base station send an RRC connection release signaling to each other under the NAS protocol. Then, the signaling connection between the user equipment and the base station is interrupted, and no more signaling is transmitted between the user equipment and the base station. That is, the RRC connection release signaling may be regarded as a signaling disconnection signal.

One alternate embodiment of the disclosure provides a transmission system for implementing the LIPA function. The transmission system includes a user equipment, a base station and a core network. The operations and functions of the user equipment, the base station and the core network are similar to the above descriptions, and are not repeated here.

In one embodiment of the disclosure, after the base station receives a PDP context activation request signaling from the user equipment, the base station checks whether the user equipment is allowed to activate the LIPA function (as indicated in FIG. 1). After the request is confirmed, the base station sends such information to the core network for the core network to complete subsequent authentication. Once the base station passes the authentication performed by the core network, the base station sends a connection interface release request signaling to the core network for transferring the connection to the base station itself. Instead of the core network, the base station sends a radio bearer setup signaling and activates PDP. After the PDP activation, the base station assigns a private IP address to the user equipment, and the user equipment uses the private IP address for data transmission. The base station performs NAT for translating the IP address assigned to the UE into an IP address of the base station for visiting an external network.

In one embodiment of the disclosure, after a user equipment sends a PS connection establishment request signaling (i.e. a PDP context activation request signal or an Internet request signaling), the base station checks whether the user equipment is allowed to activate the LIPA function. If the user equipment is allowed to activate the LIPA function, and after the base station passes the authentication performed by the core network, the base station implements the LIPA function, so that the user equipment having an IP address assigned by the base station is directly connected to an external network through the base station without going through the core network. Thus, the network loading is reduced for the telecommunication operators.

It will be appreciated by those skilled in the art that changes could be made to the disclosed embodiments described above without departing from the broad inventive concept thereof. It is understood, therefore, that the disclosed embodiments are not limited to the particular examples disclosed. The modifications of the disclosed embodiments are within the spirit and scope of the disclosed embodiments as defined by the claims that follow.

What is claimed is:

1. A method for transmitting wireless data streams, comprising:
   receiving, by a base station, a packet data protocol (PDP) context activation request signaling from a user equipment (UE);
   checking, by the base station, whether the user equipment is allowed to activate a local Internet protocol access (LIPA) function according to a LIPA check logic, which records details related to the LIPA function;
   if the base station decides that the user equipment is allowed to activate the LIPA function, instructing, by the base station, a core network to execute a first authentication through a signaling connection between the base station and the core network;
   disconnecting, by the base station, the signaling connection between the base station and the core network from the base station;
   assigning a private IP address to the user equipment by the base station, so that the user equipment assigned the private IP address performs the LIPA function and is directly connected to an external network through the base station without going through the core network,
   and performing a data transmission between the base station and the user equipment.

2. The method for transmitting wireless data streams according to claim 1, wherein, after the base station is started up, the base station obtains the LIPA check logic from the core network.

3. The method for transmitting wireless data streams according to claim 2, wherein, after receiving the PDP context activation request signaling from the user equipment, the base station checks whether an access point name and an international mobile subscriber identifier both indicate that the user equipment is allowed to activate the LIPA function according to the LIPA check logic.

4. The method for transmitting wireless data streams according to claim 1, wherein a signaling connection between the user equipment and the base station is established for transmitting signaling.

5. The method for transmitting wireless data streams according to claim 4, wherein:
   the base station receives a PDP context de-activation request signaling from the user equipment;
   the base station sends a PDP context de-activation accept signaling to the user equipment for disconnecting the data transmission between the user equipment and the base station; and
   the base station sends a connection release signaling to the user equipment to disconnect the signaling connection between the user equipment and the base station.

6. The method for transmitting wireless data streams according to claim 1, wherein:
   the first authentication and first security protection are performed between the core network and the base station; and
   a second authentication and second security protection are performed between the base station and the user equipment].

7. The method for transmitting wireless data streams according to claim 1, wherein, if the user equipment is allowed to activate the LIPA function, the base station sends a connection interface release request signaling to the core network to disconnect the signaling connection between the base station and the core network.

8. The method for transmitting wireless data streams according to claim 1, wherein a radio bearer is established between the user equipment and the base station.

9. The method for transmitting wireless data streams according to claim 1, wherein:
the base station sends a PDP context activation accept signaling to the user equipment;
the base station assigns the private IP address to the user equipment;
when the user equipment uses the private IP address for the data transmission, the base station performs a network address translation for translating the private IP address of the user equipment into its own an IP address of the base station for visiting the external network; and
the base station sends a connection release signaling to the user equipment to disconnect the signaling connection between the user equipment and the base station.

10. A system for transmitting wireless data streams, comprising:
a user equipment for sending a packet data protocol (PDP) context activation request signaling;
a base station for receiving the PDP context activation request signaling and for checking whether the user equipment is allowed to activate a local Internet protocol access (LIPA) function according to a LIPA check logic, which records details related to the LIPA function; and
a core network being instructed, by the base station, to execute a first authentication through a signaling connection between the base station and the core network, if the base station decides that the user equipment is allowed to activate the LIPA function;
wherein the base station is further for disconnecting the signaling connection between the base station and the core network; for assigning a private IP address to the user equipment, so that the user equipment having the private IP address performs the LIPA function and is directly connected to an external network through the base station without going through the core network; and for performing a data transmission between the base station and the user equipment.

11. The system for transmitting wireless data streams according to claim 10, wherein the base station is further for obtaining the LIPA check logic from the core network after the base station is started up.

12. The system for transmitting wireless data streams according to claim 11, wherein the base station is further for checking whether an access point name and an international mobile subscriber identifier both indicate that the user equipment is allowed to activate the LIPA function according to the LIPA check logic after receiving the PDP context activation request signaling from the user equipment.

13. The system for transmitting wireless data streams according to claim 10, wherein the base station is further for establishing a signaling connection between the user equipment and the base station.

14. The system for transmitting wireless data streams according to claim 13, wherein:
the user equipment is further for sending a PDP context de-activation request signaling to the base station;
the base station is further for sending a PDP context de-activation accept signaling to the user equipment for disconnecting the data transmission between the user equipment and the base station; and
the base station is further for sending a connection release signaling to the user equipment to disconnect the signaling connection between the user equipment and the base station.

15. The system for transmitting wireless data streams according to claim 10, wherein:
the first authentication and first security protection are performed between the core network and the base station; and
a second authentication and second security protection are performed between the base station and the user equipment.

16. The system for transmitting wireless data streams according to claim 10, wherein the base station is further for sending a connection interface release request signaling to the core network to disconnect the signaling connection with the base station and the core network, if the user equipment is allowed to activate the LIPA function.

17. The system for transmitting wireless data streams according to claim 10, wherein the base station is further for establishing a radio bearer is established between the user equipment and the base station.

18. The system for transmitting wireless data streams according to claim 17, wherein:
the base station is further for sending a PDP context activation request accept signaling to the user equipment;
the base station is further for assigning the private IP address to the user equipment; and
the base station is further for performing a network address translation for translating the private IP address of the user equipment into an IP address of the base station for visiting the external network, when the user equipment uses the private IP address for the data transmission.

* * * * *

UNITED STATES PATENT AND TRADEMARK OFFICE
CERTIFICATE OF CORRECTION

PATENT NO.       : 9,107,071 B2
APPLICATION NO.  : 13/530229
DATED            : August 11, 2015
INVENTOR(S)      : Zhu et al.

It is certified that error appears in the above-identified patent and that said Letters Patent is hereby corrected as shown below:

On the title page, assignee name, please replace "SERNET (SHUZHOU) TECHNOLOGIES CORPORATION" with "SERNET (SUZHOU) TECHNOLOGIES CORPORATION"

Signed and Sealed this
Twenty-second Day of December, 2015

Michelle K. Lee
*Director of the United States Patent and Trademark Office*